United States Patent [19]
Dhoot et al.

[11] Patent Number: 6,150,024
[45] Date of Patent: Nov. 21, 2000

[54] ACRYLATE RELEASE COMPOSITIONS AND SHEET MATERIALS HAVING A RELEASE COATING FORMED OF THE SAME

[75] Inventors: Sunil M. Dhoot, Woodridge; Danny C. Thompson, Streamwood, both of Ill.

[73] Assignee: Rexam Release, Inc., Beford Park, Ill.

[21] Appl. No.: 08/977,294

[22] Filed: Nov. 25, 1997

[51] Int. Cl.[7] .............................. B32B 27/30; C08F 18/20; C08F 12/20
[52] U.S. Cl. ........................... 428/421; 428/522; 526/245
[58] Field of Search .................................... 428/421, 513, 428/500, 522; 526/245, 242

[56] References Cited

U.S. PATENT DOCUMENTS

| | | | |
|---|---|---|---|
| 3,950,298 | 4/1976 | McCown et al. . | |
| 3,989,609 | 11/1976 | Brack | 522/8 |
| 4,321,404 | 3/1982 | Williams et al. | 560/115 |
| 4,383,878 | 5/1983 | Young et al. | 156/235 |
| 4,404,247 | 9/1983 | Dominguez-Burguette et al. | 428/213 |
| 4,472,480 | 9/1984 | Olson | 428/332 |
| 4,495,243 | 1/1985 | Kishi | 428/352 |
| 4,513,059 | 4/1985 | Dabroski | 428/355 R |
| 4,567,073 | 1/1986 | Larson et al. | 428/40.7 |
| 4,859,511 | 8/1989 | Patterson et al. | 428/41.4 |
| 4,873,140 | 10/1989 | McIntyre | 428/343 |
| 4,882,403 | 11/1989 | Itoh et al. . | |
| 4,929,666 | 5/1990 | Schmidt et al. | 524/516 |
| 4,954,686 | 9/1990 | Toyoshima et al. . | |
| 4,968,116 | 11/1990 | Hulme-Lowe et al. . | |
| 4,985,473 | 1/1991 | Williams et al. . | |
| 5,006,624 | 4/1991 | Schmidt et al. | 526/243 |
| 5,037,668 | 8/1991 | Nagy | 427/505 |
| 5,110,667 | 5/1992 | Galick et al. | 428/202 |
| 5,425,991 | 6/1995 | Lu | 428/352 |
| 5,476,603 | 12/1995 | Buchwald et al. | 508/345 |
| 5,492,599 | 2/1996 | Olsen et al. | 162/137 |
| 5,811,183 | 11/1998 | Shaw et al. | 428/336 |

FOREIGN PATENT DOCUMENTS

| | | |
|---|---|---|
| 0 521 605 A2 | 1/1993 | European Pat. Off. . |
| WO 91/15610 | 10/1991 | WIPO . |
| WO 95/10117 | 4/1995 | WIPO . |
| WO 96/31571 | 10/1996 | WIPO . |

OTHER PUBLICATIONS

Mark et al., Encyclopedia Polymer Science and Engineering, vol. 14, pp. 416–418, 1988.

R. Bongiovanni, et al. "Selective Enrichment of Reactive Additives at the Surface of UV–Cured Coatings", Radcure: Application and Performance.

David M. Szum, J. of Rad. Curing 22:20–24 (1995).

*Primary Examiner*—Paul Thibodeau
*Assistant Examiner*—Ramsey Zacharia
*Attorney, Agent, or Firm*—Alston & Bird LLP

[57] ABSTRACT

Compositions having release properties include at least one cross-linking agent, at least one aliphatic acrylic ester, and at least one fluorinated compound. The composition is applied to the surface of a substrate and exposed to radiation to cross-link and cure the composition to form a polymer film on a surface of the substrate having release properties.

29 Claims, No Drawings

ACRYLATE RELEASE COMPOSITIONS AND SHEET MATERIALS HAVING A RELEASE COATING FORMED OF THE SAME

FILED OF THE INVENTION

This invention relates to release compositions and sheet materials which include a release layer formed of the release composition.

BACKGROUND OF THE INVENTION

Silicone-containing materials are widely applied to film, paper and other substrates to impart release properties thereto. Although silicone-containing compositions can impart desirable release properties to the substrate to which it is applied, many release applications require a silicone-free release composition due to possible silicone contamination resulting from migration of silicone in the release coating onto an adjacent substrate and the subsequent contamination of other surfaces.

Non-silicone release materials, such as fluorine-containing materials, can also impart desirable release properties to a substrate. Typically, however, a relatively large amount of the fluorinated material is required to provide the desired release properties. Since fluorinated materials are expensive, such coatings are not cost effective. In addition, typically conventional release compositions are solvent-based systems, which can be undesirable due to environmental concerns.

SUMMARY OF THE INVENTION

The present invention is a composition which imparts release properties to a substrate to which it is applied. The compositions of the invention are not silicone-based and thus are suitable for applications in which silicone contamination is a concern. Further, the compositions of the invention are solvent-free and thus can be more environmentally acceptable. Still further, the compositions of the invention can provide effective release characteristics without requiring large quantities of expensive components.

In the invention, the compositions include one or more ethylenically unsaturated cross-linking agents, preferably acrylate-containing cross-linking agents, capable of reacting upon exposure to radiation, to cross-link and form a cured coating on a substrate to which the composition has been applied. The compositions of the invention further include as a minor component, preferably about 1 to about 20 weight percent, more preferably about 1 to about 15 weight percent, and most preferably about 1 to about 7 weight percent, of at least one fluorinated compound, such as a fluorinated acrylate. In addition, the compositions of the invention include at least one aliphatic acrylic ester, preferably a long chain alkyl ester containing 10 to 24 carbon atoms, such as lauryl acrylate.

The fluorinated compound and the cross-linking agent and aliphatic acrylic ester are partially incompatible so that the fluorinated compound migrates to the surface of the coating composition prior to curing. When the composition is exposed to radiation, the cross-linking agent reacts to create a cross-linked network. Although not wishing to be bound by any explanation of the invention, it is believed that the aliphatic acrylic ester can provide a synergistic effect with the fluorinated compound so that reduced quantities of the fluorinated compound can be used to achieve release properties comparable to compositions which do not include the aliphatic acrylic ester and which include the fluorinated compound in a higher weight percent. The resultant cured coating has a highly fluorinated low surface energy adhesive surface, despite the fact that only a relatively small amount of fluorinated compound is used.

The present invention also provides sheet materials which include a sheet material substrate and a release coating adhered to a surface of the sheet material and formed of the radiation cured cross-linked release composition of the invention.

DETAILED DESCRIPTION OF THE INVENTION

The present invention now will be described more fully as applied to several specific embodiments. It should be understood, however, that the specific embodiments are provided only for purposes of providing a better understanding of the invention and how it may be practiced in various ways. The specific embodiments described herein are merely examples and should not be construed as limiting or constricting the scope of the invention.

The radiation curable release compositions of the present invention include at least one poly-ethylenically unsaturated cross-linking agent; at least one aliphatic acrylic ester; and at least one cross-linkable fluorinated compound. The ethylenically unsaturated cross-linking agent is capable of reacting and cross-linking upon exposure to radiation to form a polymer network overlaying and adhered to the surface of a substrate. The average number of functionalities, available for cross-linking, for the cross-linking agent, should be more than two. Single component cross-linking agents having three or more functional groups and any combination of mixtures of the same are possible cross-linking agent combinations. Materials with two functional groups can also be added to the above combinations. The cross-linking agents include acrylate functionalized monomers and/or oligomers.

Exemplary acrylate functionalized cross-linking agents include diacrylates, such as 1,6-hexanediol diacrylate, 1,4-butanediol diacrylate, ethylene glycol diacrylate, diethylene glycol diacrylate, tetraethylene glycol diacrylate, tripropylene glycol diacrylate, neopentyl glycol diacrylate, 1,4-butanediol dimethacrylate, poly(butanediol) diacrylate, tetraethylene glycol dimethacrylate, 1,3-butylene glycol diacrylate, triethylene glycol diacrylate, triisopropylene glycol diacrylate, polyethylene glycol diacrylate, and bisphenol A dimethacrylate; triacrylates, such as trimethylolpropane triacrylate, trimethylolpropane trimethacrylate, pentaerythritol monohydroxy triacrylate, and trimethylolpropane triethoxy triacrylate; tetraacrylates, such as pentaerythritol tetraacrylate, and di-trimethylolpropane tetraacrylate; and pentaacrylates, such as dipentaerythritol (monohydroxy) pentaacrylate, and the like and mixtures thereof. These multifunctional acrylate monomers are commercially available from Aldrich Chemical Company, Inc., Milwaukee, Wis.

Examples of multifunctional acrylate oligomers include epoxy acrylates, such as bisphenol A epoxy diacrylate, available from Sartomer Company, Inc. of Exton, Pa. and sold under the designation CN104; urethane acrylates, such as hexafunctional aromatic urethane acrylate with an acrylated polyol diluent which is sold under the designation Ebecryl® 220 by UBC Radcure, Inc. of Louisville, Ky.; aliphatic urethane diacrylates, such as that which is available under the designation Ebecryl® 230 from UBC Radcure, Inc. of Louisville, Ky.; polyester acrylates, such as tetrafunctional polyester acrylate which is sold under the designation Ebecryl® 80 by UBC Radcure, Inc. of Louisville, Ky. and also sold under the designation Photomer 5018 by Henkel, Inc.; polybutadiene diacrylates, such as that available from Sartomer Company, Inc. of Exton, Pa. under the designation CN300; and the like and mixtures thereof.

Those skilled in the art will recognize that the terms "oligomer" and "polymer" are frequently used interchangeably. Although "oligomer" is generally used to describe a relatively short polymer, the term has no generally accepted definition with respect to the number of repeating monomer units. As used herein, then the term "oligomer" is meant to include molecules that may also be properly referred to as polymers.

Typically, the cross-linking agent is present in an amount from about 10 to about 90 weight percent based on the total weight of the composition, and more preferably from about 55 to about 75 weight percent.

Aliphatic acrylic esters useful in the present invention include monomeric and/or oligomeric acrylates. The acrylic esters are characterized as having less than two acrylate functional groups per molecule in contrast to the acrylate cross-linking agents described above. Acrylic esters are derivatives of both acrylic acid and methacrylic acid. Exemplary acrylic esters include long chain alkyl esters having 10 to 24 carbon atoms, the alkyl groups of which can be straight chained or branched. Representative aliphatic acrylic esters useful in the invention include, but are not limited to, octyl acrylate, isodecyl acrylate, tridecyl acrylate, stearyl acrylate, lauryl acrylate, and the like and mixtures thereof. The compositions of the invention can include the acrylic ester in amounts ranging from about 5 to about 60 weight percent based on the total weight of the composition, and preferably from about 20 to about 40 weight percent.

The fluorinated component of the compositions of the invention can be any of many fluorinated compounds known in the art. Examples of such compounds useful in the invention include but are not limited to polyfluorinated alkyl acrylates and methacrylates, poly(fluorooxyalkylene) acrylates and methacrylates, and the like and mixtures thereof. Fluoroacrylates useful as the release imparting agent in the compositions of the invention include those described in U.S. Pat. No. 4,321,404, the entire disclosure of which is hereby incorporated by reference, and are commercially available from 3M. Other functionalized fluorinated compounds can also be used in the invention, such as, but not limited to, fluorinated polyurethanes, fluorinated polyamides, and the like and mixtures thereof. Such functionalized compounds are commercially available.

The compositions of the invention are advantageous over prior release compositions because of the decreased quantities of fluorinated compounds required to impart desirable release properties thereto as compared to conventional release compositions. Preferably, the compositions of the invention include about 1 to about 20 weight percent, more preferably about 1 to about 15 weight percent, and most preferably about 1 to about 7 weight percent, of the fluorinated compound based on the total weight of the composition. In contrast, conventionally, release compositions which include fluorinated compounds as the release imparting component require much larger quantities (for example from 25 to 100 weight percent) to impart useful release properties to a substrate to which that composition was applied.

Although not wishing to be bound by any explanation of the invention, the inventors have found that incorporation of an aliphatic acrylic ester as described above in combination with a cross-linking agent and a fluorinated compound can result in decreased quantities of the fluorinated compound to be required to provide release properties comparable to that provided by compositions without an aliphatic acrylic ester and with higher quantities of a fluorinated compound.

The compositions of the invention can be prepared by preheating the components to a temperature ranging from about 100° F. to about 140° F., for a period of about 60 to 90 minutes, before mixing, and thereafter subjecting the composition to conditions of high shear to assure good mixture of the components. Various conventional additives as known in the art, such as anchorage agents, wetting agents, pigments, ultraviolet absorbers, dyes, and the like can be added to the compositions in conventional amounts.

When visible light or ultraviolet radiation is used to cure the release compositions of the invention, the compositions also include a source of free radicals, i.e., a material which liberates free radicals on exposure to radiation. Such compounds are also known in the art as photoinitiators. Exemplary photoinitiators include benzil dimethyl ketal, benzoin, benzoin alkyl ethers, acyloin derivatives, benzophenone, acetophenone, Michler's ketone, and derivatives of these compounds. The photoinitiator can be present in conventional amounts, typically about 1 to about 5 weight percent. While not essential to the curing process, photosensitizers may be added to make the curing process more efficient. The composition of the invention can also be cured using other radiation sources such as electron beam or X-ray radiation, in which case, typically, a photoinitiator is not required.

The release composition is then applied to a suitable sheet material substrate using any of the techniques known in the art, such as, but not limited to, roll coating, gravure coating, multi-roll coating, and the like and other coating processes. After the uncured composition is applied to a surface of a sheet material substrate, the composition can be cured by exposure to radiation under conditions suitable for converting the composition into a cross-linked polymer film which is adhered to the surface of the substrate.

The sheet material can be any conventional substrate to which a release coating is applied, including polymer films such as polyethylene, polypropylene and polyethylene terephthalate films, paper substrates, polyolefin-coated paper substrates, clay coated paper substrates, and the like.

The present invention will be further described by the following non-limiting examples.

EXAMPLES

Six formulations were prepared using the materials of Table 1.

TABLE 1

| Product Code[1] | Supplier | Description[2] |
|---|---|---|
| SR 349 | Sartomer | Ethoxylated Bisphenol A Diacrylate |
| Photomer 5018 | Henkel | Aliphatic Tetrafunctional Polyester Acrylate |
| Photomer 4061 | Henkel | Tripropylene Glycol Diacrylate |
| SR 454 | Sartomer | Ethoxylated Trimethylolpropane Triacrylate |
| SR 335 | Sartomer | Lauryl Acrylate |
| Darocur 1173 | Ciba-Geigy | 2-Hydroxy-2-methyl-1-phenyl-propan-1-one |
| Irgacure 907 | Ciba-Geigy | 2-Methyl-1-[4-(methylthio)phenyl]-2-morpholino propan-1-one |
| ITX | First Chemical | 2-Isopropylthioxanthone |
| FX-13 | 3M | Fluorochemical acrylate |

TABLE 1-continued

| Product Code[1] | Supplier | Description[2] |
|---|---|---|

Notes:
[1]Supplier's tradename.
[2]Generalized name of the component as provided by the supplier, indicating that the component may include mixtures.

The compositions of six formulations are set forth in Table 2 below. For each composition, all of the raw materials except Darocur 1173, Irgacure 907 and ITX were warmed at 140° F. prior to mixing for a period of 60 to 90 minutes, and thereafter the composition was subjected to conditions of high shear to assure good mixture of the components.

TABLE 2

| Formulation Component | 1 Wt. % | 2 Wt. % | 3 Wt. % | 4 Wt. % | 5 Wt. % | 6 Wt. % |
|---|---|---|---|---|---|---|
| SR 335 | 31 | 35 | 31 | 27 | 31 | 27 |
| SR 349 | 25 | 25 | 25 | 25 | 25 | 25 |
| SR 454 | 10 | 10 | 10 | 5 | 5 | 5 |
| Photomer 4061 | 19 | 19 | 23 | 0 | 0 | 0 |
| Photomer 5018 | 10 | 10 | 10 | 36 | 36 | 40 |
| FX-13 | 5 | 1 | 1 | 7 | 3 | 3 |
| Total | 100 | 100 | 100 | 100 | 100 | 100 |

Note: Darocur 1173, Irgacure 907, and ITX are added to each of the formulations in the amount of 2, 2, and 0.2 wt. %, respectively, of the total batch size.

Each formulation was applied to a web of high density polyethylene coated paper using an offset gravure coating technique. The coating was cured using ultraviolet light in a nitrogen inerted chamber.

Each sample was evaluated for release by several tests described below. The release force values for the different tests were measured using a release tester made by Testing Machine Inc.

In the tests designated "STM 44" and "STM 45", a solvent acrylic adhesive from National Starch (80-1068) and a cross-linking adhesive from Ashland (80-1085), respectively, were coated onto the release coating using a Byrd bar with a five mil gap and allowed to dry for five minutes in air and subsequently for ten minutes at 150° F. in a forced air oven. A one mil polyethylene terephthalate film was laminated to the adhesive surface, from which were cut 2" wide, 10" long strips. The force (grams per two inch width) required to peel the polyethylene terephthalate film, together with the adhesive from the release coated substrate at an angle of 135° and at various peel rates, was measured. Such release force tests were done for laminate samples aged at room temperature and at 120° F., for different lengths of time (immediate, 1 day, 3 days and 7 days).

The test designated "STM 42" is a subsequent adhesive test based on the 80-1068 adhesive. In this test, the polyester film/adhesive strip removed from the release layer of Test STM 44 was applied to a stainless steel surface. The strip was peeled together with the adhesive from the stainless steel surface at an angle of 180° and at a peel rate of 12 IPM. A control sample was prepared by replacing the release layer with the polyester facestock. The control sample was prepared in a manner similar to that (described above) used to prepare the test sample for the release layer. The percent subsequent adhesion was calculated as follows:

% subsequent adhesion=(Test avg., g)/(Control avg., g)×100.

In the test designated "STM 72A-D," a rubber based tape (TESA 7476 tape) commercially available from TESA, Inc., was applied to the release coating. The release force (gm/in width) required to peel a strip of 1" width×6" long of the tape together with the adhesive from the release layer, at an angle of 180°, was measured. Peel rates were 12 IPM, 300 IPM, 600 IPM and 1200 IPM, for results A, B, C, and D, respectively.

In the test designated "J&J", a Johnson & Johnson ZONAS tape was applied to the release coating. The release force (gm/inch width) required to peel a strip of 1" width×6" long of the tape together with the adhesive from the release layer, at an angle of 180° and at a peel rate of 12 IPM, was measured.

In the test designated "TESA 7475," an acrylic based tape (TESA 7475 tape), commercially available from TESA, Inc., was applied to the release coating. The release force (gm/inch width) required to peel a strip of 1" width×6" long of the tape together with the adhesive from the release layer, at an angle of 180° and at various peel rates, was measured.

The results shown in the following Tables are the average of three test samples.

Table 3 presents "STM 44" release test results at four peel rates for coated samples (formulations 1, 2 and 3) aged, at room temperature and at 120° F., for different lengths of time. Table 4 presents "TESA 7475" release test results at two peel rates for samples (formulations 1, 2 and 3) aged, at room temperature and at 120° F., for different lengths of time. Table 5 presents "STM 45", "STM 42", "STM 72A-D", "J&J", and "TESA 7475" release test results at the peel rates indicated in the table (formulations 1, 2 and 3).

TABLE 3

| | STM 44 (room temp., 12 IPM[2]) Release force, g/2 in width | | | | STM 44 (room temp., 300 IPM) Release force, g/2 in width | | | |
|---|---|---|---|---|---|---|---|---|
| FORMULATION | Immed. | Day 1 | Day 3 | Day 7 | Immed. | Day 1 | Day 3 | Day 7 |
| 1 (600 fpm[1]) | 744 | 1044 | 1386 | 1695 | 397 | 465 | 529 | 511 |
| 2 (600 fpm) | 828 | 1152 | 1165 | 1143 | 203 | 586 | 555 | 753 |
| 3 (600 fpm) | 912 | 1443 | 1382 | 1383 | 263 | 505 | 566 | 555 |
| 3 (1000 fpm) | 1005 | 1068 | 1033 | 874 | 501 | 307 | 308 | 291 |

| | STM 44 (120° F., 12 IPM) Release force, g/2 in width | | | | STM 44 (120° F., 300 IPM) Release force, g/2 in width | | | |
|---|---|---|---|---|---|---|---|---|
| FORMULATION | Immed. | Day 1 | Day 3 | Day 7 | Immed. | Day 1 | Day 3 | Day 7 |

TABLE 3-continued

| | | | | | | | | |
|---|---|---|---|---|---|---|---|---|
| 1 (600 fpm) | 744 | 1395 | 1098 | 1109 | 397 | 321 | 286 | 301 |
| 2 (600 fpm) | 828 | 1135 | 1146 | 1189 | 203 | 258 | 440 | 700 |
| 3 (600 fpm) | 912 | 1273 | 1054 | 1041 | 263 | 181 | 288 | 280 |
| 3 (1000 fpm) | 1005 | 1101 | 997 | 1279 | 501 | 379 | 299 | 286 |

| | STM 44 (room temp., 600 IPM) Release force, g/2 in width | | | | STM 44 (room temp., 1200 IPM) Release force, g/2 in width | | | |
|---|---|---|---|---|---|---|---|---|
| FORMULATION | Immed. | Day 1 | Day 3 | Day 7 | Immed. | Day 1 | Day 3 | Day 7 |
| 1 (600 fpm) | 184 | 247 | 213 | 221 | 214 | 209 | 263 | 232 |
| 2 (600 fpm) | 133 | 179 | 186 | 156 | 226 | 158 | 136 | 139 |
| 3 (600 fpm) | 170 | 127 | 191 | 205 | 175 | 133 | 195 | 171 |
| 3 (1000 fpm) | 168 | 150 | 180 | 169 | 138 | 190 | 180 | 153 |

| | STM 44 (120° F., 600 IPM) Release force, g/2 in width | | | | STM 44 (120° F., 1200 IPM) Release force, g/2 in width | | | |
|---|---|---|---|---|---|---|---|---|
| FORMULATION | Immed. | Day 1 | Day 3 | Day 7 | Immed. | Day 1 | Day 3 | Day 7 |
| 1 (600 fpm) | 184 | 233 | 243 | 263 | 214 | 262 | 271 | 263 |
| 2 (600 fpm) | 133 | 205 | 209 | 241 | 226 | 156 | 146 | 148 |
| 3 (600 fpm) | 170 | 210 | 182 | 147 | 175 | 183 | 155 | 132 |
| 3 (1000 fpm) | 171 | 194 | 286 | 218 | 138 | 214 | 237 | 195 |

[1]"fpm" = feet per minute.
[2]"IPM" = inches per minute.

TABLE 4

| | TESA 7475 (room temp., 12 IPM) Release force, g/in width | | | | TESA 7475 (room temp., 300 IPM) Release force, g/in width | | | |
|---|---|---|---|---|---|---|---|---|
| FORMULATION | Immed. | Day 1 | Day 3 | Day 7 | Immed. | Day 1 | Day 3 | Day 7 |
| 1 (600 fpm) | 930 | 1045 | 1424 | 1700 | 280 | 310 | 312 | 348 |
| 2 (600 fpm) | 1494 | 2401 | 1814 | 1939 | 360 | 381 | 454 | 387 |
| 3 (600 fpm) | 907 | 1093 | 1015 | 1567 | 248 | 315 | 307 | 320 |
| 3 (1000 fpm) | 1328 | 1020 | 1618 | 1288 | 320 | 294 | 330 | 402 |

| | TESA 7475 (120° F., 12 IPM) Release force, g/in width | | | | TESA 7475 (120° F., 300 IPM) Release force, g/in width | | | |
|---|---|---|---|---|---|---|---|---|
| FORMULATION | Immed. | Day 1 | Day 3 | Day 7 | Immed. | Day 1 | Day 3 | Day 7 |
| 1 (600 fpm) | 930 | 1198 | 1488 | 1854 | 280 | 353 | 338 | 275 |
| 2 (600 fpm) | 1494 | 1649 | 2066 | 2086 | 360 | 489 | 565 | 674 |
| 3 (600 fpm) | 907 | 815 | 1172 | 1632 | 148 | 348 | 381 | 309 |
| 3 (1000 fpm) | 1328 | 1227 | 1664 | 1509 | 320 | 406 | 397 | 400 |

TABLE 5

| | STM 45 Release force (g/2 inch width) Room Temp. | STM 42 % Subsequent Adhesion Room Temp. | STM 72A-D Release force (g/inch width) | J&J Release force (g/inch width) Room Temp. | | TESA 7475 Release force (g/inch width) Room Temp.; Immediate | | | |
|---|---|---|---|---|---|---|---|---|---|
| FORMULATION | 12 IPM | 12 IPM | Room Temp. | 12 IPM | 1200 IPM | 12 IPM | 300 IPM | 600 IPM | 1200 IPM |
| 1 (600 fpm) | 783 | 78% | weld | 578 | 652 | 861 | 304 | 245 | 233 |
| 2 (600 fpm) | 1191 | 81% | weld | 599 | 525 | 1476 | 392 | 354 | 397 |
| 3 (600 fpm) | 1587 | 80% | weld | 560 | 453 | 745 | 275 | 277 | 180 |
| 3 (1000 fpm) | 1435 | 72% | weld | 605 | 678 | 1214 | 357 | 319 | 287 |

For each of formulations 1, 2 and 3, the above data shows that the release force is much higher at the peel rates of 12 IPM than at the higher peel rates. No release was observed with the rubber based tape 7476 for the samples prepared using formulations 1, 2 and 3. The cross-linking adhesive Ashland 1085 (STM 45) showed very high release values at 12 IPM compared to the release values shown by the solvent acrylic adhesive from National Starch 1068 (Test STM 44) and the release values shown by the solventless acrylic adhesive tape TESA 7475.

Analysis of the results for the first three formulations indicated certain directions for additional formulations. Formulations 4, 5, and 6 were prepared based on this analysis and applied to a polyethylene coated paper, cured and tested for release.

Each of the formulations 4, 5 and 6 were coated at 600 and 1000 FPM to provide six test results. The tests performed were STM 44 at room temperature and at 120° F., STM 42 at room temperature, STM 45 at room temperature, STM 72 at room temperature and TESA 7475 at room temperature. For each test, four stripping speeds (12 IPM, 300 IPM, 600 IPM and 1200 IPM) and four different aging times (immediately, one day, three days, and seven days) were used. The results are set forth in Table 6 below.

TABLE 6

| FORMULATION | | STM 45 (Room Temp.) | | | STM 44 (Room Temp.) | | | STM 44 (120° F.) | | | STM 42 % Subsequent Adhesion (Room Temp.) |
|---|---|---|---|---|---|---|---|---|---|---|---|
| | | 12 IPM | 300 IMP | 600 IMP | 1200 IMP | 300 IMP | 600 IMP | 1200 IMP | 300 IMP | 600 IMP | 1200 IMP | 12 IPM |
| 4 (600 fpm) | IMMED | 536 | 184 | 137 | 112 | 50 | 46 | 37 | 50 | 46 | 37 | 110 |
| | 1 DAY | 495 | 172 | 115 | 117 | 46 | 45 | 42 | 53 | 46 | 40 | |
| | 3 DAY | 399 | 161 | 159 | 113 | 53 | 39 | 39 | 57 | 56 | 49 | |
| | 7 DAY | 503 | 141 | 134 | 105 | 63 | 44 | 66 | 63 | 43 | 58 | |
| 4 (1000 fpm) | IMMED | 583 | 208 | 132 | 130 | 53 | 38 | 43 | 53 | 38 | 43 | 142 |
| | 1 DAY | 582 | 175 | 120 | 102 | 55 | 43 | 38 | 62 | 37 | 38 | |
| | 3 DAY | 594 | 213 | 140 | 118 | 51 | 55 | 36 | 46 | 52 | 51 | |
| | 7 DAY | 486 | 213 | 136 | 146 | 59 | 61 | 42 | 50 | 43 | 45 | |
| 5 (600 fpm) | IMMED | 319 | 176 | 164 | 121 | 53 | 43 | 53 | 53 | 43 | 53 | 123 |
| | 1 DAY | 893 | 176 | 163 | 135 | 59 | 67 | 41 | 62 | 47 | 53 | |
| | 3 DAY | 841 | 142 | 157 | 151 | 77 | 62 | 60 | 47 | 57 | 44 | |
| | 7 DAY | 672 | 207 | 185 | 119 | 74 | 54 | 46 | 53 | 51 | 47 | |
| 5 (1000 fpm) | IMMED | 683 | 151 | 131 | 133 | 80 | 65 | 60 | 80 | 65 | 60 | 100 |
| | 1 DAY | | 260 | | | 56 | 55 | 44 | 55 | 54 | 49 | |
| | 3 DAY | | 350 | | | 64 | 60 | 50 | 70 | 84 | 42 | |
| | 7 DAY | | 268 | | | 71 | 60 | 56 | 84 | 62 | 44 | |
| 6 (600 fpm) | IMMED | | 363 | | | 54 | 59 | 60 | 54 | 59 | 60 | 135 |
| | 1 DAY | | 299 | | | 80 | 45 | 70 | 66 | 42 | 66 | |
| | 3 DAY | | 442 | | | 75 | 66 | 54 | 65 | 57 | 58 | |
| | 7 DAY | | 218 | | | 55 | 78 | 40 | 64 | 50 | 60 | |
| 6 (1000 fpm) | IMMED | | 160 | | | 83 | 50 | 45 | 83 | 50 | 45 | 110 |
| | 1 DAY | | 255 | | | 77 | 46 | 43 | 54 | 85 | 54 | |
| | 3 DAY | | 249 | | | 80 | 66 | 46 | 73 | 55 | 54 | |
| | 7 DAY | | 212 | | | 91 | 48 | 53 | 65 | 59 | 54 | |
| | 7 DAY | | 198 | | | | | | | | | |

| FORMULATION | | TESA 7475 (120° F.) | | | | STM 72A-D | | |
|---|---|---|---|---|---|---|---|---|
| | | 12 IPM | 300 IMP | 600 IMP | 1200 IMP | 12 IPM | 300 IMP | 600 IMP |
| 4 (600 fpm) | IMMED | 210 | 59 | 44 | 37 | 281 | 189 | 149 |
| | 1 DAY | 223 | 58 | 46 | 46 | | | |
| | 3 DAY | 196 | 61 | 50 | 40 | | | |
| | 7 DAY | 191 | 64 | 52 | 45 | | | |
| 4 (1000 fpm) | IMMED | 230 | 70 | 50 | 40 | 309 | 217 | 182 |
| | 1 DAY | 241 | 78 | 56 | 43 | | | |
| | 3 DAY | 268 | 73 | 57 | 52 | | | |
| | 7 DAY | 195 | 84 | 60 | 51 | | | |
| 5 (600 fpm) | IMMED | 233 | 90 | 60 | 51 | 354 | 266 | 229 |
| | 1 DAY | 234 | 98 | 73 | 56 | | | |
| | 3 DAY | 215 | 92 | 65 | 54 | | | |
| | 7 DAY | 237 | 97 | 81 | 69 | | | |
| 5 (1000 fpm) | IMMED | 228 | 81 | 67 | 68 | 293 | 273 | 222 |

TABLE 6-continued

| | | | | | | | | | | | | |
|---|---|---|---|---|---|---|---|---|---|---|---|---|
| 6 (600 fpm) | 1 DAY | 546 | 147 | 153 | 168 | 238 | 96 | 82 | 71 | | | |
| | 3 DAY | 595 | 202 | 160 | 141 | 257 | 102 | 81 | 72 | | | |
| | 7 DAY | 539 | 180 | 164 | 142 | 264 | 95 | 85 | 82 | | | |
| | IMMED | 370 | 146 | 131 | 120 | 216 | 75 | 65 | 52 | 302 | | |
| | 1 DAY | 661 | 130 | 159 | 148 | 234 | 81 | 67 | 64 | | 200 | 230 | 252 |
| | 3 DAY | 537 | 210 | 183 | 115 | 213 | 89 | 74 | 58 | | | |
| | 7 DAY | 727 | 212 | 145 | 144 | 232 | 99 | 82 | 70 | | | |
| 6 (1000 fpm) | IMMED | 595 | 371 | 174 | 163 | 217 | 87 | 63 | 69 | 238 | | |
| | 1 DAY | 943 | 239 | 186 | 167 | 274 | 89 | 72 | 74 | | 235 | 210 | |
| | 3 DAY | 485 | 311 | 163 | 96 | 286 | 91 | 78 | 63 | | | |
| | 7 DAY | 593 | 212 | 151 | 171 | 240 | 91 | 82 | 70 | | | | 226 |

In each of formulations 4, 5 and 6, the release force values decreased substantially. In addition, release was observed with the rubber based tape 7476. Aging effects for all of the samples were small and the release force values were stable over time. Further, the effect of changing speed of the web from 600 FPM to 1000 FPM on the release values was not significant. Test STM 45 with the cross-linking adhesive gave higher release values than with the other tests, and STM 44 test results showed very little impact of temperature on the release force values.

The foregoing examples are illustrative of the present invention and are not to be construed as limiting thereof. The invention is defined by the following claims, with equivalents of the claims to be included therein.

That which is claimed is:

1. A sheet material comprising:
   a sheet material substrate; and
   a release coating overlying and adhered to a surface of said sheet material substrate, said coating comprising a cross-linked polymer derived from a cross-linkable composition comprising about 55 to about 75 weight percent of at least one poly-ethylenically unsaturated cross-linking agent, about 20 to about 40 weight percent of at least one aliphatic acrylic ester, and about 1 to about 20 weight percent of at least one cross-linkable fluorinated compound.

2. The sheet material of claim 1, wherein said release coating is derived from a radiation cured cross-linked polymer.

3. The sheet material of claim 1, wherein said at least one cross-linkable fluorinated compound is present in an amount of about 1 to about 15 weight percent.

4. The sheet material of claim 3, wherein said at least one cross-linkable fluorinated compound is present in an amount of about 1 to about 7 weight percent.

5. The sheet material of claim 1, wherein said poly-ethylenically unsaturated cross-linking agent comprises at least one acrylate containing cross-linking agent.

6. The sheet material of claim 5, wherein said acrylate containing cross-linking agent comprises a compound selected from the group consisting of diacrylates, triacrylates, tetraacrylates, pentaacrylates, epoxy acrylates, urethane acrylates, aliphatic urethane diacrylates, polyester acrylates, polybutadiene diacrylates, and mixtures thereof.

7. The sheet material of claim 6, wherein said acrylate containing cross-linking agent comprises a compound selected from the group consisting of 1,6-hexanediol diacrylate, 1,4-butanediol diacrylate, ethylene glycol diacrylate, diethylene glycol diacrylate, tetraethylene glycol diacrylate, tripropylene glycol diacrylate, neopentyl glycol diacrylate, 1,4-butanediol dimethacrylate, poly(butanediol) diacrylate, tetraethylene glycol dimethacrylate, 1,3-butylene glycol diacrylate, triethylene glycol diacrylate, triisopropylene glycol diacrylate, polyethylene glycol diacrylate, bisphenol A dimethacrylate, trimethylolpropane triacrylate, trimethylolpropane trimethacrylate, pentaerythritol monohydroxy triacrylate, trimethylolpropane triethoxy triacrylate, pentaerythritol tetraacrylate, di-trimethylolpropane tetraacrylate, dipentaerythritol (monohydroxy) pentaacrylate, bisphenol A epoxy diacrylate, hexafunctional aromatic urethane acrylate, tetrafunctional polyester acrylate, polybutadiene diacrylate, and mixtures thereof.

8. The sheet material of claim 5, wherein said acrylate containing cross-linking agent comprises at least two different compounds, each of said at least two different compounds having different average number of functional groups available for cross-linking.

9. The sheet material of claim 5, wherein said acrylate containing cross-linking agent comprises at least one tetraacrylate.

10. The sheet material of claim 9, wherein said acrylate containing cross-linking agent further comprises at least one diacrylate, at least one triacrylate, or both.

11. The sheet material of claim 1, wherein said at least one aliphatic acrylic ester comprises at least one straight chain or branched alkyl ester containing 10 to 24 carbon atoms.

12. The sheet material of claim 11, wherein said at least one alkyl ester comprises a compound selected from the group consisting of octyl acrylate, isodecyl acrylate, tridecyl acrylate, stearyl acrylate, lauryl acrylate, and mixtures thereof.

13. The sheet material of claim 1, wherein said at least one cross-linkable fluorinated compound comprises at least one cross-linkable fluorinated acrylate.

14. The sheet material of claim 13, wherein said at least one cross-linkable fluorinated acrylate comprises a compound selected from the group consisting of polyfluorinated alkyl acrylates and methacrylates, poly(fluorooxyalkylene) acrylates and methacrylates, and mixtures thereof.

15. The sheet material of claim 1, wherein said sheet material substrate comprises a polymer film.

16. The sheet material of claim 15, wherein said polymer film is a polyethylene, polypropylene, or polyethylene terephthalate film.

17. The sheet material of claim 1, wherein said sheet material substrate is a paper substrate.

18. The sheet material of claim 1, wherein said sheet material substrate is a polyolefin coated paper substrate.

19. A sheet material comprising:
    a sheet material substrate; and
    a release coating overlying and adhered to a surface of said sheet material substrate, said coating comprising a cross-linked polymer derived from a cross-linkable composition comprising:
      about 55 to about 75 weight percent of at least two acrylate containing cross linking agents having different average numbers of functional groups available for cross-linking;
      about 20 to about 40 weight percent of at least one aliphatic acrylic ester; and
      about 1 to about 20 weight percent of at least one cross-linkable fluorinated compound.

20. The sheet material of claim 19, wherein said composition comprises about 1 to about 15 weight percent of said at least one cross-linkable fluorinated compound.

21. The sheet material of claim 20, wherein said composition comprises about 1 to about 7 weight percent of said at least one cross-linkable fluorinated compound.

22. The sheet material of claim 19, wherein said at least two acrylate containing cross-linking agents comprises at least one letraacrylate.

23. The sheet material of claim 22, wherein said at least two acrylate containing cross-linking agents further comprises at least one diacrylate, at least one triacrylate, or both.

24. A sheet material comprising:
    a sheet material substrate; and
    a release coating overlying and adhered to a surface of said sheet material substrate, said coating comprising a cross-linked polymer derived from a cross-linkable composition comprising:
      about 55 to about 75 weight percent of at least one acrylate containing cross linking agent;
      about 20 to about 40 weight percent of at least one aliphatic acrylic ester; and about 1 to about 15 weight percent of at least one cross-linkable fluorinated compound.

25. The sheet material of claim 24, wherein said release coating comprises about 1 to about 7 weight percent of at least one cross-linkable fluorinated compound.

26. A sheet material comprising:

a sheet material substrate; and a release coating overlying and adhered to a surface of said sheet material substrate, said coating comprising a cross-linked polymer derived from a cross-linkable composition comprising:

about 55 to about 75 weight percent of acrylate containing cross linking agents having different average numbers of functional groups available for cross-linking and comprising at least one tetrafunctional acrylate containing cross linking agent;

about 20 to about 40 weight percent of at least one aliphatic acrylic ester; and about 1 to about 15 weight percent of at least one cross-linkable fluorinated acrylate.

27. The sheet material of claim 26, wherein said release coating comprises about 1 to about 7 weight percent of at least one cross-linkable fluorinated acrylate.

28. The sheet material of claim 26, wherein said release coating further comprises at least one diacrylate, at least one triacrylate, or both.

29. The sheet material of claim 28, wherein said release coating overlying and adhered to a surface of said sheet material substrate comprises a cross-linked polymer derived from a cross-linkable composition comprising:

about 25 weight percent of a difunctional acrylate cross linking agent;

about 5 weight percent of a trifunctional acrylate cross-linking agent;

about 36 weight percent of a tetrafunctional acrylate cross-linking agent;

about 27 weight percent lauryl acrylate; and about 7 weight percent of a cross-linkable fluorinated acrylate.

* * * * *